United States Patent Office 3,620,127
Patented Nov. 16, 1971

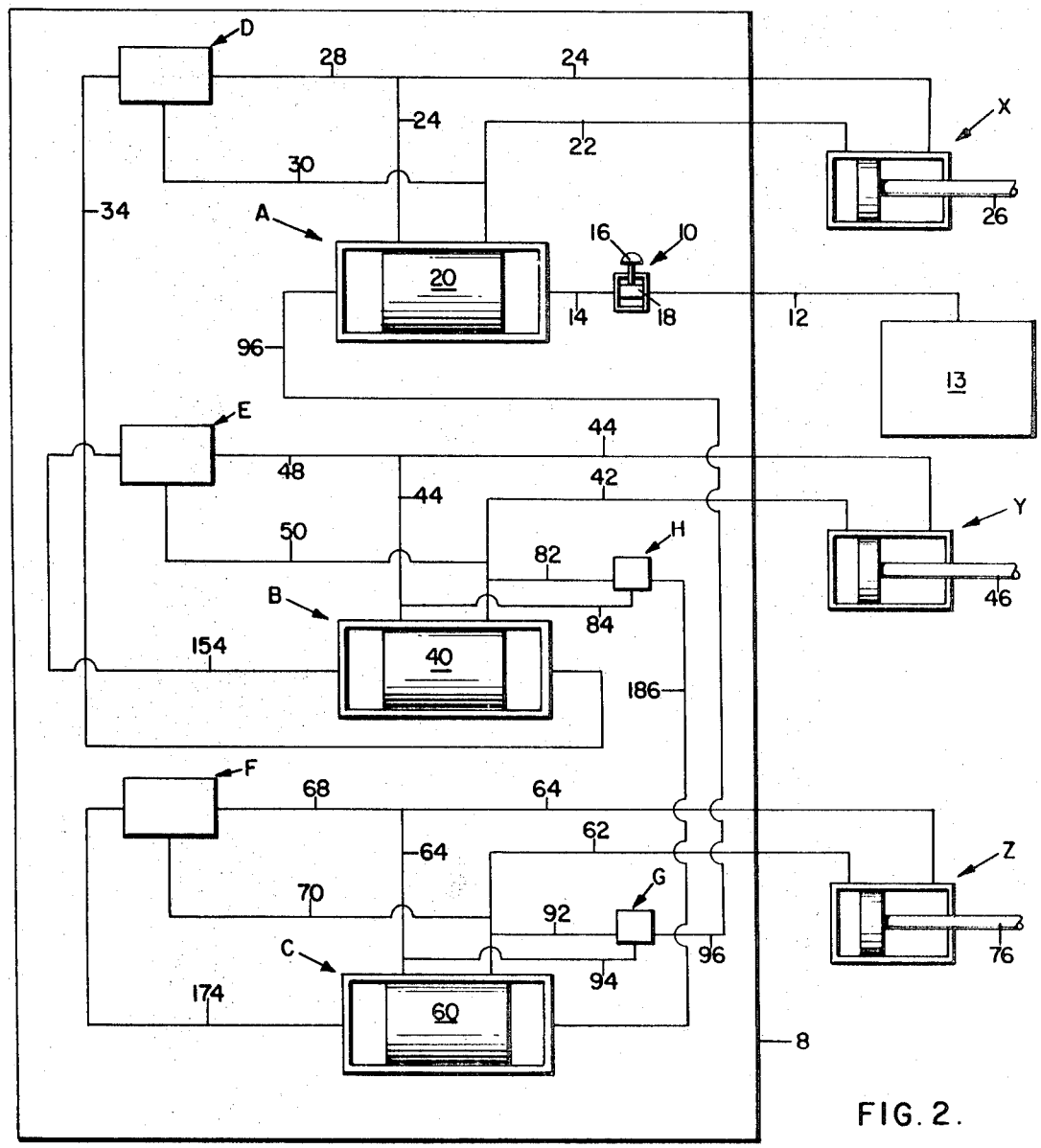
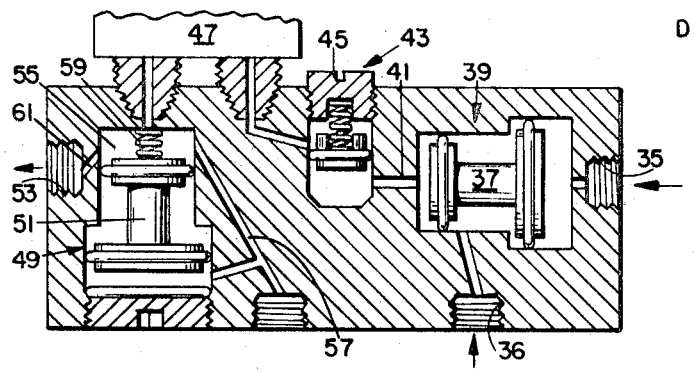
FIG. 2.
FIG. 3.
INVENTOR.
KENNETH R. BLAISDELL

3,620,127
SEQUENTIAL PULSING SYSTEM
Kenneth R. Blaisdell, 17 Savoy Ave.,
East Longmeadow, Mass. 01028
Filed Nov. 17, 1969, Ser. No. 877,245
Int. Cl. F15b 11/22, 21/02
U.S. Cl. 91—412     1 Claim

ABSTRACT OF THE DISCLOSURE

A system of programming a sequential series of mechanism-actuated operations independent of any external timing or switching or limiting valve means.

SUMMARY OF THE INVENTION

The invention relates to mechanisms for supplying signals or pulses, via air or other fluid under pressure, in a flow line or lines to a plurality of fluid-actuated devices or actuators in a predetermined sequence.

It envisions a fluid control system especially designed and adapted for structural incorporation in a wide variety of mechanisms, apparati and devices which, or parts of which, are required to function periodically or to be energized, actuated, set in motion or otherwise successively influenced in accordance with a predetermined plan involving a proper timing of the controlling influence with respect to both the starting time and the duration of functioning of each controlled element.

It provides an improved fluid control system comprehending fluid pressure and exhaust lines and a plurality of programmers or combinations of devices operable in sequence by the fluid pressure and rendered automatic in the performance of their respective actions by the fluid pressure flowing thereinto and therefrom in manner such as to control the discharge or delivery of fluid at a plurality of points, places or stations successively according to a predetermined order.

According hereto, a plurality of serially-associated flow-controlling devices are activated in seriatim by signals or pulses which may, if desired, be passaged through logic elements for influence thereby and which signals or pulses serve actuators which may be sequentially activated (extended and/or retracted) according to a preset program.

The invention envisions means for supplying fluid pressure to a plurality of actuators in such a way that, during an operating cycle, the actuators are motivated, singly or in multiple, in a desired sequence. This comprehends means for controlling the order in which each actuator is motivated in each direction and manually-adjustable means for individually controlling the condition under which one actuator is motivated relative to the motivation of the actuator immediately prior thereto in the sequence.

It offers a system wherein any desirable number of actuators can be employed and rendered operative and inoperative in any desired sequence from a central control panel or console in which the entirety of the programmer may be housed.

By exploiting the supply pressure to and the exhaust pressure from an actuator, it is possible to develop a signal, when the differential pressure has reached an adjustable desired value, which serves to shift a next sequential control valve.

The invention is characterized by the employment of fluid pressure and exhaust means connected between an actuator and a differentiator/pulser which functions to sense a pressure differential and accordingly to emit a pulse or signal, all cooperant with a control unit for receiving such pulse or signal, the components being interconnected for chain operation and each including means for utilizing the pulse or signal for the actuation of a next succeeding such control unit, and the emission of the pulse or signal being successively controlled or regulated as to time of occurrence and strength.

The invention additionally envisions the incorporation within the system of other appliances or means such as switches for electrical control, strain gauges for electrical control, diaphragms for vacuum control, or fluid sensitive members or differentiators for hydraulic control, or like appliances or means, whereby the offices of the above mentioned agencies may be adjustably regulated to predeterminately control their respective actions, all being correlated in the broad aim of enhancing the efficiency of the fluid control system for any of the various uses and purposes for which it is primarily designed and intended.

According hereto, in the design and construction of circuits involving a plurality of actuators following a fixed sequence automatically or semi-automatically, any one of a myriad number of different sequences can be attained merely by the simplest of adjustments or changes in connections between the console-located system elements.

The system, as envisioned, is self-piloting and reciprocating by virtue of internal lines interconnecting the actuators and the respective piloting means for operating respective supporting valves of the spool or slide type, the piloting means accomplishing the avoidance of premature valve shifting before its actuator has accomplished its work mission.

The self-piloting feature is inherent in the internal connection of the actuator pressurizing and exhausting lines to the chambers of its supporting differentiator/pulser, the pressurized actuator line connecting to one port thereof and the exhausted actuator line connecting to another port thereof, whereby is accomplished a shifting of a next subsequent valve at a predetermined subsequent moment in the work cycle.

Piloting is attainable by the differentiator/pulser which, as exemplified, is disposed as a separate mechanism with respect to a console but which, understandably, could be readily incorporated into a control valve and made unitary therewith, the desideratum in either eventuality being that when a pressure signal is delivered to the mechanism and when a signal cutoff is effected, it is then possible, through a pulsing function, to obtain a shifting of a spool or slide in a next-to-be-actuated control valve.

The invention comprehends automatic reciprocation of pilot valving by means of a pressure signal of a duration sufficient to shift the spool or slide, the differentiator/pulser shutting itself off following the shift.

BRIEF DESCRIPTION OF THE DRAWINGS

FIG. 2 is a schematic representation of a second exemplary arrangement of components illustrating another practical application of the system of the invention; and FIG. 3 is an enlarged diagrammatical view in section through an exemplary type of differentiator/pulser employable in the system of the invention.

DESCRIPTION OF THE PREFERRED EMBODIMENTS

Figure 1:
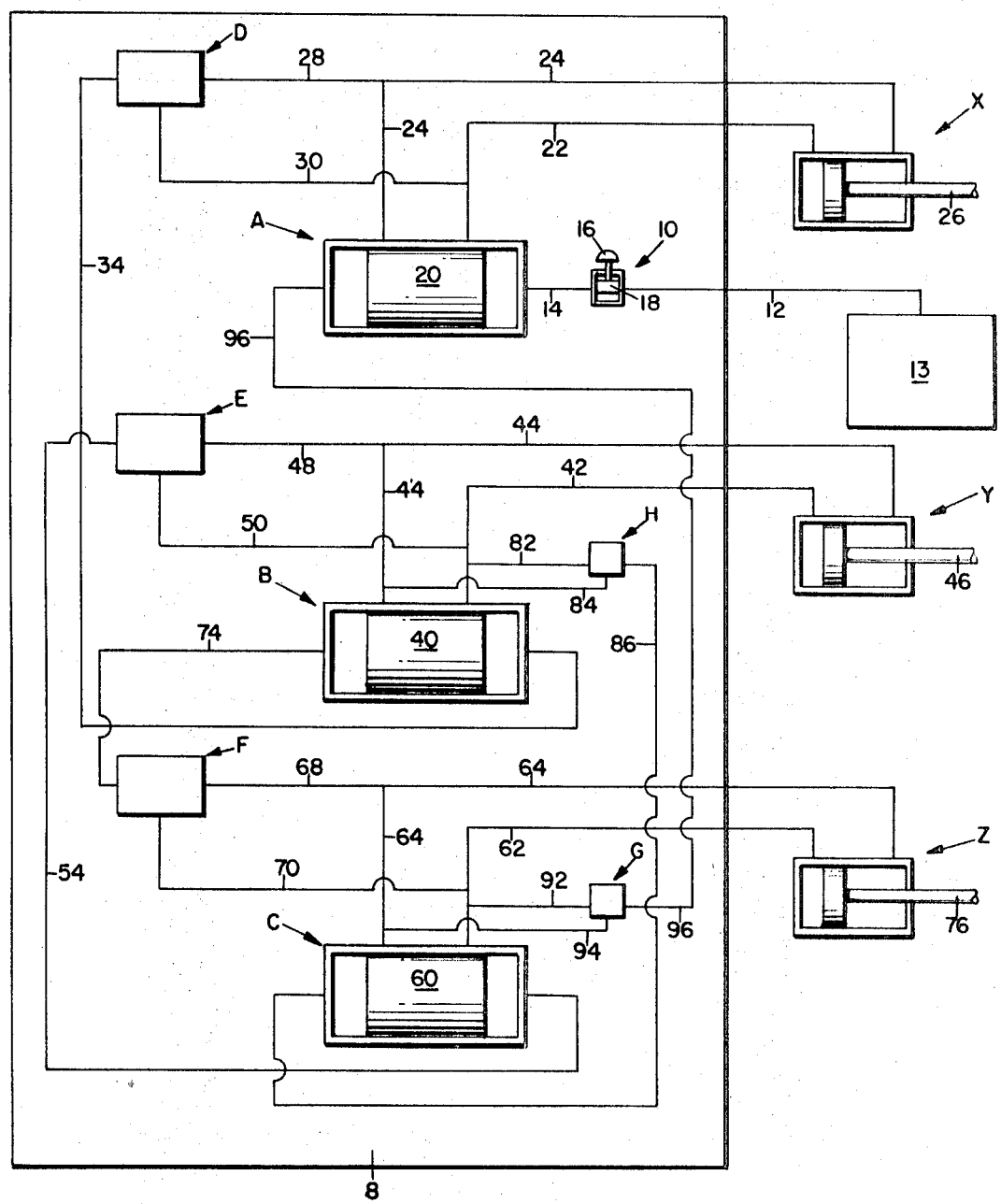
FIG. 1 is a schematic representation of a first exemplary arrangement of components illustrating one practical application of the system of the invention.

A programmer, as a combination of a control valve and a differentiator/pulser and an actuator for serving the apparatus or device or mechanism to be controlled may be termed, may be arranged in a series of several such units. Three such programmers are herein shown.

In the FIG. 1 arrangement, a typical sequence of operations, as performed by a trio of actuators X, Y and Z, is exemplified as used in such as a machine-operating sequence, wherein, in the order of sequential operations:

(1) piston 26 of actuator X is motivated in an extended stroke
(2) piston 46 of actuator Y is motivated in an extended stroke
(3) piston 76 of actuator Z is motivated in an extended stroke
(4) piston 46 of actuator Y is motivated in a retracted stroke
(5) piston 76 of actuator Z is motivated in a retracted stroke
(6) piston 26 of actuator X is motivated in a retracted stroke.

Actuators X, Y and Z understandably will be located at locations convenient to the work each is to perform, which locations may be distantly of a central control panel or console 8 whereat the various system components are unitarily assembled for ready access thereto.

Control valves A, B and C on console 8 will be understood to serve actuators X, Y and Z respectively.

Program commencement would normally be by a manual signal as by an initiating means, generally indicated by 10, in the form of a push button valve or equivalent, which is connected by a main supply line 12 to an outside source of supply fluid 13 with a capacity for controlling delivery of a signal to the inboard side of control valve A through a line 14.

Outside fluid supply source 13 will be understood to be a source of air or other fluid connected to main supply line 12 and to be constantly pressurized, apart from any general shut off, irrespective of the circuit state.

Alternatively, control valve A could be otherwise energized, mechanically or electrically or pneumatically, in order to accomplish sequencing initiation.

Control valve A preferentially will be of the differential pressure shifting type including a spool or slide.

Actuation of initiating means 10, as by the depression of a hand member 16 of a pilot valve 18, delivers a pulse sufficient to effect a shifting of a spool 20 in control valve A from a rightward position (as viewed in FIG. 1) to a leftward position, thereby to attain a pressurizing of a line 22, interconnecting the control valve and actuator X, and concomitantly an exhausting of a line 24, also interconnecting the control valve and actuator on opposite sides of the respective spool 20 of the control valve and piston 26 of the actuator.

Pressurizing of line 22 and exhausting of line 24 achieves a firing of piston 26 as step 1 of the sequence, in an extending (outward) stroke of the piston.

Because the programming functions are by means of the sensing of pressure and exhaust values, the speeds and timings and dwells of the actuators preferentially will be controlled by manually-adjustable restrictive devices mounted in the connecting lines or at their connecting terminals as operating conditions dictate.

A differentiator/pulser D, sometimes called a pilot valve, is exemplified as being separate from control valve B which it serves, but as aforesaid, will be understood as being capable of incorporation integrally with its respective control valving, if desired.

While identified as a differentiator/pulser, it will also be understood that, in addition to including means for achieving the differentiating and pulsing functions, it could include a cooperant logic element disposed between the differentiating and pulsing means for instances where inclusion of such a logic element may be desirable.

Differentiator/pulser D functions to differentiate fluid pressure to insure that the exhaust value and the pressure value of lines connecting thereto have reached their required adjustable limits so as to avoid premature shifting of the actuator from which input thereto is dependent before that actuator has accomplished its assigned work mission, to transmit its acquired intelligence to a logic element, if one be used, and to convert the appropriate signal from the differentiator and/or logic element through and from the pulser as a momentary pulse or signal to the next-to-be-activated control valve and its served actuator.

A line 28 interconnects differentiator/pulser D and line 24 between control valve A and actuator X. When the pressure in line 28 drops to a predetermined limit of p.s.i., (say 2 p.s.i.), the pressure in a line 30, interconnecting between the differentiator/pulser D and line 22, builds up to a desired pressure, at which moment it effects a shifting of a spool or slide or diaphragm 37 in the differentiator/pulser so as to allow a flow of fluid pressure through and outwardly thereof in the form of a momentary signal through a line 34 connecting between the differentiator/pulser and the inboard side of the next-to-be-served control valve B.

Differentiator/pulser D, shown in detail in FIG. 3, is of such design that when a decreasing pressure at inlet 35, connecting to line 28, drops to the predetermined p.s.i. value, an increasing pressure at inlet 36, connecting to line 30, effects a rightward movement of its spool 37 in a provided differential spool valve indicated by 39 where the increasing and decreasing areas are in a ratio of as much as 50:1. Thus, the supply from the pressurized inlet or port is bled into the housing venting through the spool valve chamber which is kept open by the exhaust flow in line 28.

On completion of the piston stroke, exhaust flow in line 28 reaches the predetermined limit and the bleed flow of increasing pressure is diverted through a passage 41 toward an adjustable spring-loaded pressure control valve 43 so as to overcome the sealing function thereof. Valve 43 may be preloaded as by a manual adjusting means 45 and so set as to require the build up in the line to a predetermined pressure before the signal to shift member 37 is generated and then to allow delivery of the fluid of such increased pressure to a logic element 47, if one be employed, or directly to an impulse valve generally indicated by 49. In the normal situation, the fluid passes outwardly of the impulse valve chamber through outlet 53 to line 34 in the form of a momentary pressure signal or pulse, the pulsing effect being achieved by virtue of the fact that the fluid of increasing pressure also passes through a line 57 to the chamber beneath spool valve 51 so as ultimately to force the spool valve upwardly against the action of a spring 59 to the point where the line 61 leading to outlet 53 is sealed off.

This momentary pressure signal in line 34 is sufficient to attain a shifting of a spool 40 within control valve B from a rightward position (as shown in FIG. 1) to a leftward position and then to cause the pressure signal thereupon to be cut off, spool shifting having been achieved, until differentiator/pulser D is next again pulsed.

The logic element, as the component is herein envisioned, will be construed to mean a unit having a capacity for deciding whether a signal can be delivered to the next subsequent valve means in the line. When and as the logic conditions are satisfied, it allows a desired signal to act upon the next valve. Until such satisfaction, its denies action by the signal.

Now with respect to control valve B, the control device for the next-to-be-motivated actuator Y, as spool 40 so shifts, allows a pressurizing of a line 42 and an exhausting of a line 44, which lnes 42 and 44 interconnect between the control valve and actuator on opposite sides of the respective spool 40 of the control valve and piston 46 of the actuator.

The pressurizing of line 42 and concomitant exhausting of line 44 achieves step 2 in the sequence, the extending of piston 46.

A differentiator/pulser E allows, when the pressure in line 48, interconnecting between the differentiator/pulser and line 44, drops to a predetermined value, the pressure in lines 42 and 50. interconnecting between the differentiator/ pulser and line 42, to effect a shifting of its spool or diaphragm and thus a flow of fluid pressure outwardly of the differentiator/pulser in the form of a momentary signal through a line 54 connecting between the differentiator/pulser and the inboard side of the next-to-be-served control valve C.

As spool 40 in control valve B shifts, the pressure change reflected at differentiator/pulser E is such that when actuator Y reaches the end of its extending stroke and the exhaust pressure in line 48 drops to its predetermined minimum, the pressure in line 50 flows through the differentiator/pulser and thence through line 54 to effect a shifting of a spool 60 in control valve C from its position to the right (as viewed in FIG. 1) to a position to the left, thereby to achieve a pressurizing of a line 62 and an exhausting of a line 64, which lines 62 and 64 interconnect between control valve C and actuator Z. Upon completion of the shifting of spool 60, the pressure signal from differentiator/pulser E is then shut off by the relay action of a built-in relay in control valve C or in differentiator/pulser E.

The pressurizing of line 62 and exhausting of line 64 achieves an extending of piston 76 of actuator Z, step 3 in the sequence.

A differentiator/pulser F allows, when the pressure in a line 68 interconnecting between the differentiator/pulser and line 64, drops to a predetermined value, the pressure in line 62 and in a line 70 interconnecting between the differentiator/pulser and line 62, to effect a shifting of its spool or diaphragm and thus a flow of fluid pressure outwardly as a momentary signal through a line 74 to the outboard side of control valve B so as to shift the spool of that control valve returnably to its original position, and hence the pressurizing of line 44 and exhausting of line 42, resulting in a retracting of piston 46 of actuator Y, step 4 in the sequence.

Retraction of piston 46 achieves an exhaustion of line 42 and a pressurization of line 44 so that a valve H, connected to line 42 by a line 82 which, at this moment, is exhausted, and connected to line 44 by a line 84, delivers a signal to the outboard side of control valve C through a line 86 to return spool 60 to original position and hence to pressurize line 64 and exhaust line 62, resulting in a retracting of piston 76 of actuator Z, step 5 in the sequence.

Retraction of piston 76 achieves an exhausting of line 62 and a pressurizing of line 64 so that a valve G, connected to line 62 by a line 92 which, at this moment is exhausted, and connected to line 64 by a line 94, achieves a signal to the outboard side of control valve A through a line 96 which returns spool 20 in control valve A to original position and hence pressurizes line 24 and exhausts line 22, resulting in a retracting of piston 26 of actuator X, step 6 in the sequence.

A continuous repeat or recycling of the described cycle can be achieved by means of a momentary pressure signal in line 14 to control valve A, which cycling can be achieved by manual or automatic means.

At cycle completion, or upon shut-down, or in the event of any unprogrammed interruption of the sequence, interconnections can be such that the system will reset to the so-called start position when the main fluid supply is exhausted.

Not only does this arrangement allow sequential valve control without external valving or switching means, but also it prevents the sequence from continuing at any point in the program in the absence of a definite valve shift. Should a leak develop at any moment at any point along the system, either along any line or valve or at any connection, cycling would be precluded for the reason that there would be no pressure signal to accomplish any subsequent shifting.

For effecting any step in the sequence, a valve shift is mandatory.

Any desired effective pressure on any actuator is realizable by a control of the differential pressure setting at which any or pilot valves is/are made to function.

Control modules or valves may be inserted into any of the signal lines, and/or between any of them, in an interconnecting manner so as to achieve a complete system of fluid control logic.

If desired, strain guages and/or vacuum gauges could be disposed in lines 28 and 30 before or ahead of the differentiator/pulser.

In a second exemplary arrangement of the same components, a different sequence of operations as performed by the same trio of actuators X, Y, and Z is envisioned as follows:

(1) the piston of actuator X is motivated in an extended stroke
(2) the piston of actuator Y is motivated in an extended stroke
(3) the piston of actuator Y is motivated in a retracted stroke
(4) the piston of actuator Z is motivated in an extended stroke
(5) the piston of actuator Z is motivated in a retracted stroke
(6) the piston of actuator X is motivated in a retracted stroke.

The changes in sequencing from that disclosed in the first or FIG. 1 exemplification is shown in the second or FIG. 2 exemplification wherein the three changes are illustrated as follows:

(1) instead of a line 54 connecting to valve C (as in the first exemplification), a line 154 connects to valve B
(2) instead of a line 74 connecting to valve B (as in the first exemplification), a line 174 connects to valve C
(3) instead of a line 86 connecting to valve C (as in the first exemplification), a line 186 connects to the opposite end of valve C.

The reactivation of the cycle, once stopped, is accomplished by a manual activation of initiating means 10 or like mechanism employed to deliver the initiating signal to the first-served control valve.

I claim:
1. A fluidic programmer for controlling the sequence of a cycle having successive phases under conditions of pulsings being functions of pressure differentials comprising the combination of:
   a plurality of actuators each having piston means movable in an assigned work mission direction and returnably in opposite direction,
   a plurality of control valves each serving an actuator,
   a plurality of first command connections each disposed between a control valve and respective served actuator,
   a plurality of second command connections each disposed between a control valve and respective served actuator,
   a plurality of differentiator/pulsers each sensing the operational activity of a respective control valve and served actuator,
   a plurality of first responsive connections each connected between one of the command connections and respective differentiator/pulser,
   a plurality of second responsive connections each connected between the other of the command connections and respective differentiator/pulser,
   a source of supply fluid and a main fluid supply line connecting between the source of supply fluid and a first-to-be-served control valve,
   program initiating means for effecting delivery of a pulsing signal through the main supply line for energizing the first-to-be-served control valve into the sequence of a cycle with a pressurizing of the respective first command connection and exhausting of the respective second command connection, each differentiator/pulser including a differentiating means for attaining and differentiating the exhaust and pressure values in the respective first and second responsive connections and precluding shifting of the respective actuator before completion of its movement in a direction and a pulsing means for converting the signal from the differentiating means to a momentary pulsing signal, a plurality of interconnecting connections each connected between a differentiator/pulse and the next-to-be actuated control valve, with the next-to-be-actuated control valve being pulsed by the momentary pulse signal from the pulsing means of the serving differentiator/pulser.

References Cited

UNITED STATES PATENTS 3,332,443    7/1967    Mize _____ 137—624.14

ALAN COHAN, Primary Examiner

U.S. Cl. X.R.

137—624.14, 624.18; 60—97